June 4, 1929.  B. W. KEESE  1,715,416
BRAKE MECHANISM
Filed May 11, 1927   2 Sheets-Sheet 1

Inventor
Beverly W. Keese
By William A. Strauch
Attorney

June 4, 1929.    B. W. KEESE    1,715,416
BRAKE MECHANISM
Filed May 11, 1927    2 Sheets-Sheet 2
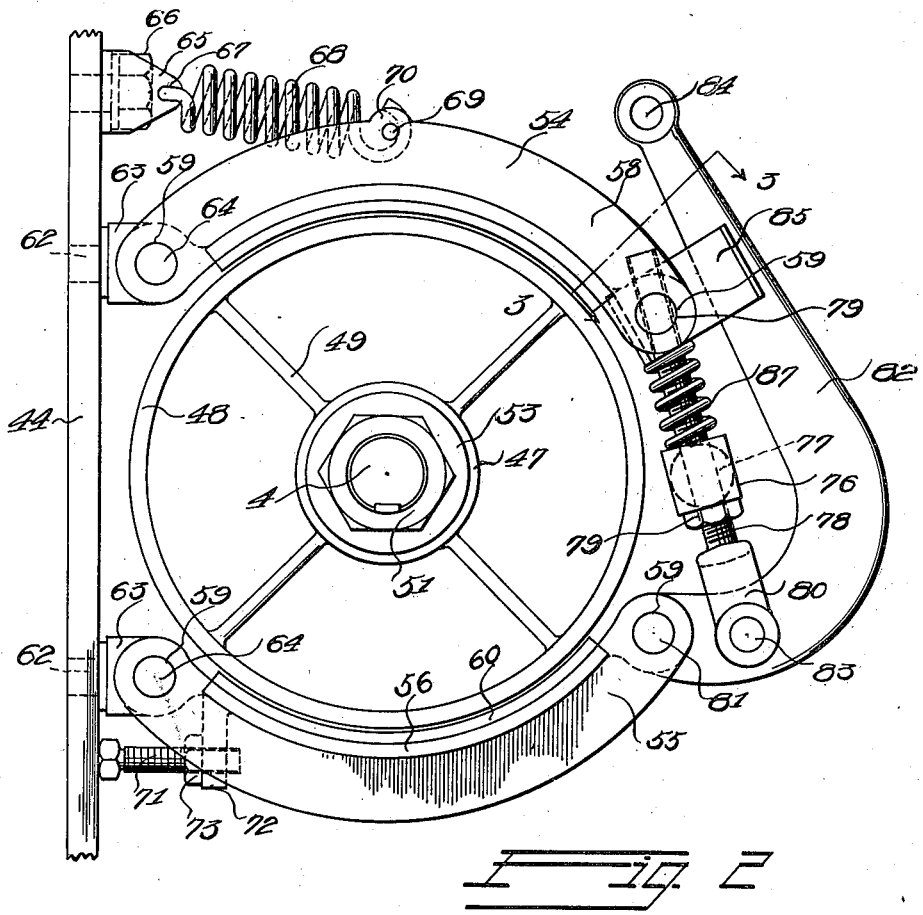
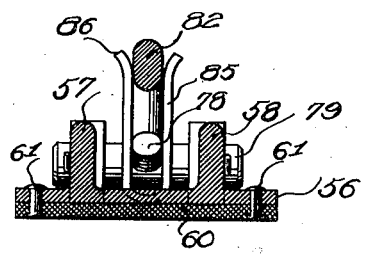
Inventor
Beverly W. Keese
By William A. Strauch
Attorney Patented June 4, 1929.

1,715,416

UNITED STATES PATENT OFFICE.

BEVERLY W. KEESE, OF OSHKOSH, WISCONSIN, ASSIGNOR TO WISCONSIN PARTS COMPANY, OF OSHKOSH, WISCONSIN.

BRAKE MECHANISM.

Application filed May 11, 1927. Serial No. 190,539.

This invention relates to improved brake mechanism.

More particularly the invention relates to improved brake mechanism for the cross-shaft or intermediate shaft of a double reduction axle construction.

A primary object of this invention is to provide brake mechanism for the ends of a removable intermediate shaft of a double reduction axle construction.

A further object of the invention is to provide an improved brake mechanism which is simple in construction and effective in operation.

A still further object of this invention is the provision of an improved brake mechanism which is capable of being readily adjusted and will remain positively in any adjusted position.

With these and other objects in view as may become apparent from the following disclosure, reference will now be had to the accompanying drawings in which—

Figure 2 is a side elevational view of one of the brake mechanisms, and

Figure 3 is a sectional view taken along line 3—3 of Figure 2.

Figure 1:
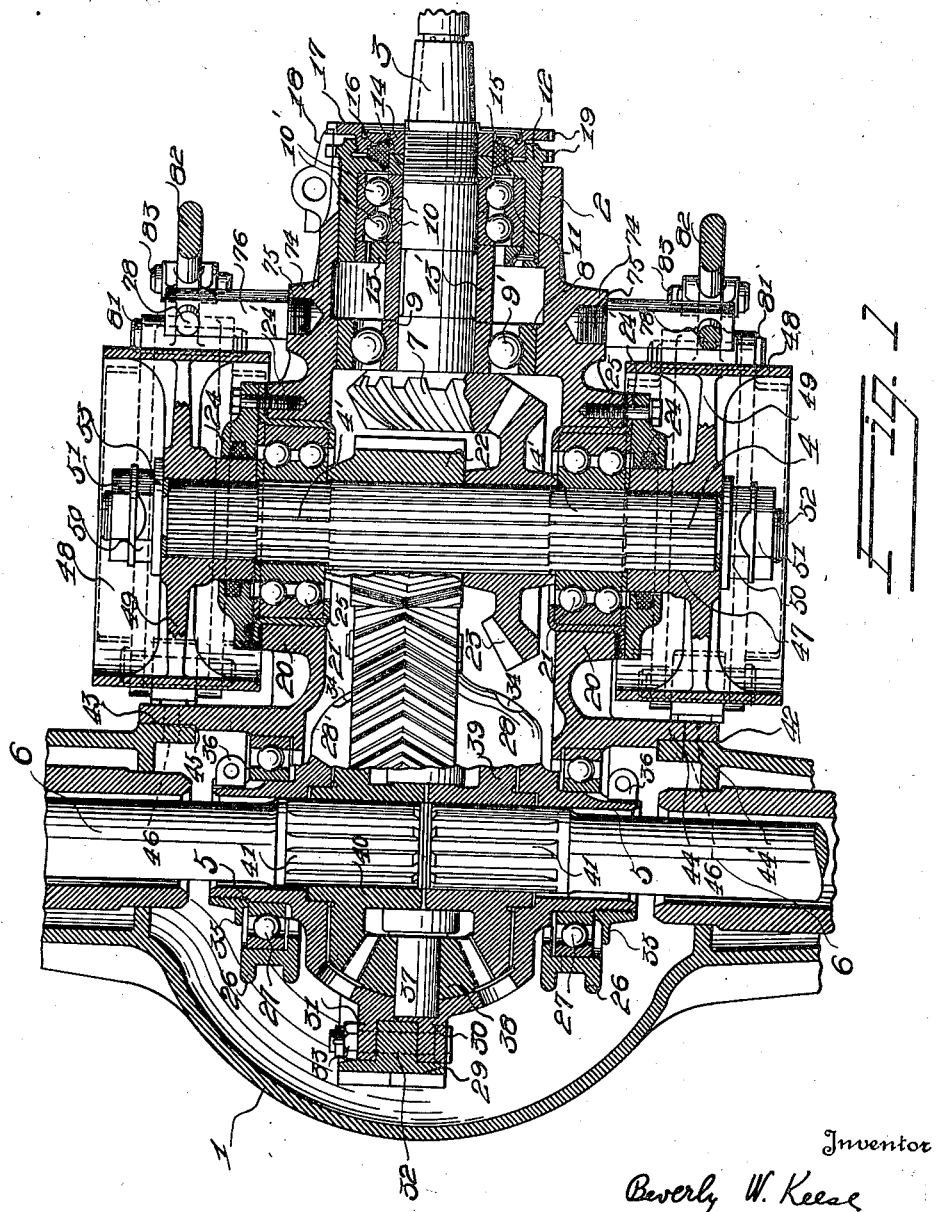
Figure 1 is a horizontal sectional view of the axle construction and brake mechanism.

Referring to the drawings, 1 indicates the load supporting housing, 2 the gear supporting housing, 3 the primary driving shaft or propeller shaft section, 4 the intermediate shaft, and 5 the hollow differential supporting extensions. Extensions 5 support the differential housing as will more fully hereinafter appear. Supported in the differential housing 5 are the enlarged ends of the axle sections 6.

Formed integrally with or secured to the inner end of shaft section 3 is a bevel pinion 7. Shaft 3 is adjustably supported in the forward cylindrical end of housing 2 by means of a suitable ball or anti-friction bearing comprising a hardened ball race 8 rigidly supported in casing 2 and a ring 9 supporting shaft 3 on the balls 9'. The forward end of shaft 3 is supported on split rings 10 of an anti-friction ball thrust bearing. Rings 10 are supported on balls 10' which in turn are supported on the thrust race 11 secured in the adjusting sleeve member 12 by means of the threaded retaining member 13. An adjusting and spacing sleeve 13' surrounding shaft 3 is interposed between rings 9 and 10. The bearing supporting and adjusting sleeve 12 is threaded externally and screws into the end of housing 2 and rings 9, 10 and member 13' are held in assembled relation on shaft 3 by means of the threaded securing and locking collars 14. Sleeve 12 is provided with an annular shoulder 15 against which a packing member 16, such for example as a felt washer is held by means of a packing gland 17 threaded into the end of sleeve 12. Sleeve 12 and gland 17 are locked in position by means of a locking dog 18 pivotally mounted on housing 2 and adapted to seat in locking notches 19.

Gear housing 2 is provided with lateral hollow tubular extensions 20 whose common axis preferably lies in the same plane as the axis of the drive shaft 3. In these extensions the intermediate shaft 4 is removably mounted. The intermediate shaft is provided with reduced portions 4' supported in the tubular extensions 20. Shaft 4 is longitudinally splined or grooved and slidably supported thereon are the suitably splined or grooved spur pinion 22 and the bevel gear 23. Bevel gear 23 meshes with and is driven by the bevel pinion 7 transmitting the motion of primary shaft 3 to the intermediate shaft 4.

The gears and bearings are slid endwise upon the intermediate shaft 4 in a sub-assembly and are secured in housing 2 by caps 24 secured to extensions 20 by cap screws 24', suitable bushings 25 being interposed between the extensions 20, bearings 21 and caps 24.

It will be observed that by this arrangement the shaft 4 can readily be removed from the gear housing without removing pinion 22 or gear 23 upon removal of either cap 24.

Supported in extensions 26 of housing 2 are anti-friction or ball bearings 27. Hollow extensions 5 of the differential housings 28 and 28' are supported with the axes of rotation of extensions 5 at right angles to and preferably in the plane of the axis of primary shaft 3 and intermediate shaft 4. Differential ring gear 29 meshing with pinion 22 on intermediate shaft 4 is secured to flanges 30 and 31 of housing sections 28 and 28' by means of an inwardly extending peripheral flange 32 on gear 29 and bolts 33 extending therethrough and through said flanges.

Housing sections 28 and 28' are provided with openings 34 to permit the flow of lubricant from the axle housing to the differential gears.

The ends of extensions 5 project through the bearings 27 and are threaded externally, the differential mechanism and bearings 27 being held in position by collars 35 threaded on extensions 5. Collars 35 which are split are held from inadvertent turning by suitable bolts passing through ears 36.

It will be seen that the housing sections are not duplicates, that is, the ring gear 29 is not centrally located with respect to the ends of the differential spindles 5. Nevertheless the arrangement of the gears within the differential housing is symmetrical with respect to a vertical plane including the axis of the driving shaft 3. To this end studs or spindles 37 are rotatably mounted in differential housing section 28 with their axes in the vertical plane of shaft 3. Mounted on the studs or spindles 37 are bevel pinions 38 meshing with bevel gears 39 and 40 slidably splined to the inner ends of axle sections 6 through the splined ends 41 thereof. By the arrangement just described interchangeable axle shafts 6 may be used, axle shafts 6 being duplicates in construction and length.

Axle or load supporting housing 1 is provided with a central opening 42 and a flat or plane supporting and locating surface 43 to receive and properly locate the gear housing. It will be noted that locating surface 43 is in a plane that is normal or perpendicular to the axis of primary driving shaft 3 and preferably to a plane comprising all of the shaft axes. Gear housing 2 is provided with an attaching flange 44 recessed on its inner surface to provide a locating tongue or shoulder 45 that engages the finished or machined wall of the opening 42 in the axle housing and serves to locate or center the gear housing 1. Flange 44 is also provided with a finished or machined surface 44′ in a plane perpendicular to normal to the axis of shaft 3 and is secured to the axle housing by bolts or studs 46. It will be understood that the remainder of the axle not specifically described may be of any well known type.

By supporting all of the shafts in the gear housing with a locating plane perpendicular to the axis of the primary driving shaft, a construction is provided that may be produced with a minimum of machining operations. The locating surfaces and the bearing surfaces for the driving shaft can be machined in one set up, providing satisfactory supporting surfaces for the machining of the bearing surfaces for the other shafts. Moreover, by this arrangement a construction is provided that is extremely simple and practical and in which replacements can be made with the minimum of expense.

The intermediate shaft 4 is provided with a reduced extension 4″ at each end beyond the reduced portions 4′, each extension 4″ being adapted to support an improved brake mechanism. Each extension 4″ is splined and slidably supported on each splined extension is a suitably splined hub portion 47 of a brake drum 48, the drum being supported from the hub portion by means of suitable spokes 49.

The hub portions are held on the extensions and in engagement with the bearings 21 by means of nuts 50 and 51 threaded on reduced threaded ends 52 of the shaft 4, suitable washers 53 being interposed between the hubs 47 and nuts 50.

The brake drums are therefore rigidly secured to the ends of the shaft 4.

Cooperating with each brake drum is a pair of diametrically opposed brake shoes 54 and 55, each comprising an arcuate metallic strip 56 having integral outstanding flanges 57 and 58 which flanges extend at either end beyond the strip 56.

The flanges 57 and 58 at each end of each shoe are provided with aligned apertures 59 providing bearings for pintle connections hereinafter referred to.

Each shoe is further provided with a suitable friction lining 60 suitably secured to the metallic strip 56 as by riveting as indicated at 61.

Secured in the attaching flange 44 are the shank portions 62 of spaced apertured lugs 63. Each brake shoe has one end pivotally secured to a lug 63 by means of a suitable pin or pintle 64 extending through the apertures in the lugs and the adjacent aperture 59 of the brake shoe. The upper brake shoes 54 are normally held out of contact with the brake drums by resilient connections between the shoes and the attaching flange 44, each connection comprising an angular clip 65, one leg of which is secured to flange 44 by means of a stud bolt 66 and the other leg of which is apertured as at 67 adapted to receive an angular end of a coil spring 68, the opposite end of which is hooked over a pin 69 extending transversely through the flanges 57 and 58, the flanges at this point being reinforced as indicated at 70.

The lower brake shoes 55 are normally maintained out of contact with the drum by the action of gravity and these shoes are each provided with an adjustable stop means to prevent them from falling too far away from the drums, the stop means each comprising a long bolt 71 threaded into a lug 72 extending downwardly from the base of the shoe, the head of the bolt being adapted to abut the flange 44. The bolt is held in any adjusted position by means of a lock nut 73.

It will thus be seen that the upper and lower brake shoes at their ends adjacent the flange 44 have a pivotal connection therewith. Means are provided for swinging the brake shoes about their pivotal connections into contact with the drums to effect a braking action, which means comprises the following.

Threaded into a boss 74 on the housing 2 at each side thereof is the reduced threaded end 75 of a guide block 76 which projects outward from the housing and is transversely apertured as designated at 77. Slidably extending through the aperture 77 is a threaded rod 78 provided with a nut 79, adapted to serve as an adjusting means and stop member. The threaded rod 78 is adapted to engage a threaded aperture in a rotatably mounted pin 79 extending through the aligned apertures 59 in the end of the upper brake shoe opposite the pivotally mounted end. The opposite end of the rod 78 is provided with a U-shaped connecting member 80.

Pivotally connected to the end of the lower brake shoe opposite the pivotally connected end by means of a pin 81 is one end of a lever 82 which lever is substantially J-shaped in side elevation. The curved portion of the lever extends between the legs of the member 80 and is pivotally connected thereto by means of the pin 83. The lever 82 has the straight portion normally extending backward toward the flange 44 and is provided at its end with an aperture 84 adapted for connection of the brake rod. The base of the upper shoe has suitably secured therein the base portion of a U-shaped resilient guide member 85, the legs of which are outwardly curved as indicated at 86. Said legs are adapted to engage the lever 82 in inoperative position of the brake mechanism.

Interposed between the guide block 76 and the adjacent end of the upper brake shoe is a coil spring 87 which tends to hold the lever between the legs of the clip member and also aids the spring 68 in holding the upper shoe out of engagement with the drum. The upper and lower shoes can be adjusted to any suitable distance from the drum by turning the nut 79 and by threading the end of rod 78 into or out of the pin 79.

In operation of the brake mechanism, a pull through the brake rod is transmitted to the end of the lever 82, the curved portion of which first pivots at 83 and draws the lower shoe into contact with the drum, whereupon the lever pivots at 81 and draws the rod 78 downward thus bringing the upper shoe into engagement with the drum. Upon releasing the brakes the lower shoe will fall away from the drum and the upper shoe will be drawn away from the drum through the combined action of the springs 68 and 87, the springs also drawing the lever 82 back into inoperative position.

It will be observed that the brake mechanism just described is shown duplicated at opposite ends of the shaft 4 on the drawings. It will be understood, however, that one of these mechanisms may be omitted, if desired, since the braking force is applied to both driven wheels by only one of such mechanisms. Two such mechanisms are used when increased braking force is desired.

Having thus set forth my invention, what I claim and desire to secure by United States Letters Patent is:

1. In combination, a primary driving shaft, axle driving shafts, an intermediate shaft, the axes of shafts all lying in a single plane and operatively connected through a chain of gears, and brake mechanism carried by the ends of the intermediate shaft.

2. In combination, a primary driving shaft, an intermediate shaft at right angles thereto, reduction gears operatively connecting said shafts, axle driving shafts parallel to said intermediate shaft, a differential operatively connecting said intermediate shaft and axle driving shafts, the intermediate shaft being independently endwise removable, and brake mechanisms carried by the ends of the intermediate shaft.

3. A double reduction axle construction including an axle housing, a gear housing, a primary shaft, an intermediate shaft, a differential, axle sections driven by said differential, a brake drum fixed on said intermediate shaft, braking means cooperating with said drum and supported on said gear housing and mechanism to cause said braking means to engage said drum.

4. The combination defined in claim 3 in which the braking means comprises curved brake shoes pivoted to the gear housing to swing toward each other to engage oppositely disposed peripheral portions of the brake drum.

5. The combination defined in claim 3 in which the brake actuating mechanism includes a link, a lever and a spring surrounding said link and engaging fixed abutment in a manner to normally hold the braking means in inoperative position.

6. A double reduction axle construction including a housing, an intermediate shaft, reducing gears and a brake drum on said shaft, brake shoes curved to fit a substantial portion of the peripheral surface of said drum pivoted to said casing, mechanism to successively apply said brake to return said shoes to their inoperative position.

7. The combination defined in claim 6 in which said mechanism comprises a link sliding through a guide block mounted on said casing, and a coil spring arranged between one side of said block and one of said shoes, and an adjustable abutment between the other side of said block and the other of said shoes.

8. An axle construction including a housing, a primary drive shaft, an intermediate shaft, a differential, and axle sections driven by said differential, gearing between said primary shaft and differential including gears slidably mounted on said intermediate shaft, a brake drum slidably mounted on said intermediate shaft, means to clamp said gears and brake drum on said intermediate shaft, brake shoes surrounding a substantial portion of the periphery of said brake drum, means to apply said brake shoes to said brake drum and spring means to return said shoes to their inoperative position.

9. The combination defined in claim 8 including a second brake drum and cooperating braking mechanism applied to said intermediate shaft.

10. An axle construction that includes an intermediate shaft parallel to the axle, comprising a pair of brake drums on opposite ends of said intermediate shaft, a pair of brake shoes for each brake drum, each pivoted at one end to a fixed pivot, each pair of brake shoes being connected together at their other ends by means including a link slidably mounted in a fixed guide block and an operating lever to successively apply said shoes to said brake drums.

11. A double reduction axle construction comprising a gear housing, and an axle housing, a primary drive shaft, an intermediate shaft, and a differential shaft journaled in said housing with their axes in the same plane, flanges on said gear housing to locate said housing with respect to said axle housing, a brake drum on said intermediate shaft, brake shoes secured to said gear housing flanges and arranged to overlie diametrically opposite portions of said brake drum, means to successively apply said shoes to said drum, and spring means to cause said shoes to return to their inoperative position upon release of said applying means.

12. The combination defined in claim 11 in which said shoes are pivotally attached to said gear housing flanges.

13. A double reduction axle construction including a casing and an intermediate shaft carrying the speed reducing gears, a brake drum on said shaft and a pair of brake shoes supported at three points on said casing, independent of the drum, and a brake arm to cause said shoes to successively engage diametrically opposite portions of said drum.

14. A double reduction axle comprising a casing, an intermediate shaft journaled in said casing, a flange on said casing adjacent said intermediate shaft, a brake drum on said shaft, a pair of brake shoes, each pivoted at one end on said flange and designed to engage diametrically opposite portions of said drum, a guide block on said casing, a brake operating lever pivoted to the free end of one of said shoes, a link passing slidably through said block and connecting said lever adjacent its pivotal connection to the free end of said other shoe, and springs to normally separate said shoes.

15. The combination defined in claim 14 in which a spring to separate said shoes from the drum is arranged to extend between said guide block and the free end of one of said shoes.

16. A brake mechanism comprising a rotatably mounted drum, a pair of arcuate brake shoes pivoted adjacent said drum and movable toward and from the drum, a lever pivoted at one end adjacent the free end of one of said shoes, a fixed abutment, a link pivoted at one end to said lever adjacent its connection to one of the brake shoes, said link being slidable with respect to said abutment and being connected to a pivot arranged adjacent the end of the other of said shoes, a spring arranged between one side of said abutment and the end of the arcuate brake shoe last mentioned, and means to actuate said lever to cause said first mentioned shoe to be first brought into engagement with said drum and to then cause said link to draw said second mentioned shoe into engagement with said drum in opposition to said spring.

17. A brake mechanism comprising a rotatably mounted drum, a pair of pivoted arcuate brake shoes arranged above and below said drum, both shoes being mounted for gravitational swinging on their pivots, spring means to hold the upper of said shoes out of contact with said drum, a stop to hold the lower of said shoes in position adjacent said drum, a lever pivoted at one end, a fixed abutment, a link secured to said lever adjacent its pivot and to a pivot secured adjacent the end of the other shoe, said link being slidably mounted in said abutment, a coil spring between one side of said abutment and the end of the brake shoe last mentioned, and means to actuate said lever whereby said brake shoes are successively brought into contact with said drum.

18. A brake mechanism comprising a rotatably mounted brake drum, a pair of arcuate brake shoes each pivoted at one end adjacent said drum, a lever pivoted to the free end of one of said shoes, a link pivoted to said lever adjacent its connection to said last mentioned shoe and adjustably connected at its opposite end to a pivot provided adjacent the free end of the other of said shoes, a fixed abutment, said link being slidable in said abutment, a coil spring surrounding said link being slidable in said abutment, a coil spring surrounding said link and arranged between one side of said abutment and the free end of the last mentioned brake shoe, and a stop adjustably mounted on said link on the other side of said abutment, and means for operating said lever whereby said shoes are caused to be successively brought into contact with said drum.

19. A brake mechanism comprising a rotatably mounted brake drum, a pair of arcuate brake shoes each pivoted adjacent one end for movement toward and from said drum, a lever pivoted to the free end of one of said shoes, a link pivoted to said lever adjacent its connection to the last mentioned shoe, said link being externally threaded and being adjustably threaded in a pivot provided in the end of the other of said shoes, a fixed abutment provided with an opening to slidably receive said threaded link, a coil spring arranged between one side of said abutment and the free end of one of said shoes, and a nut threaded on said link on the side of said abutment opposite from said spring, and means to operate said lever whereby said shoes are caused to be brought successively in contact with said drum.

In testimony whereof I affix my signature.

BEVERLY W. KEESE.